(12) United States Patent
Sundberg et al.

(10) Patent No.: US 9,860,895 B2
(45) Date of Patent: Jan. 2, 2018

(54) MOBILE STATION, NETWORK NODE, AND METHODS FOR ASSIGNING RESOURCE BLOCKS TO THE MOBILE STATION

(71) Applicant: Telefonaktiebolaget L M Ericsson (publ), Stockholm (SE)

(72) Inventors: Mårten Sundberg, Årsta (SE); Eric Nordström, Stockholm (SE); Paul Schliwa-Bertling, Ljungsbro (SE); Sajal Kumar Das, Bangalore (IN); John Walter Diachina, Garner, NC (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 28 days.

(21) Appl. No.: 14/787,876

(22) PCT Filed: May 5, 2014

(86) PCT No.: PCT/SE2014/050548
§ 371 (c)(1),
(2) Date: Oct. 29, 2015

(87) PCT Pub. No.: WO2014/182225
PCT Pub. Date: Nov. 13, 2014

(65) Prior Publication Data
US 2016/0073400 A1    Mar. 10, 2016

Related U.S. Application Data

(60) Provisional application No. 61/820,338, filed on May 7, 2013.

(51) Int. Cl.
*H04W 88/02* (2009.01)
*H04W 72/04* (2009.01)
*H04L 5/00* (2006.01)

(52) U.S. Cl.
CPC ....... *H04W 72/0446* (2013.01); *H04L 5/0042* (2013.01); *H04L 5/0092* (2013.01); *H04W 72/048* (2013.01); *H04W 88/02* (2013.01)

(58) Field of Classification Search
CPC .................................................. H04W 72/0446
(Continued)

(56) References Cited

U.S. PATENT DOCUMENTS 7,397,818 B2 *  7/2008  Restivo ................ H04B 7/2612
                                                        370/329
8,055,294 B2 * 11/2011  Lee ...................... H04W 52/367
                                                        370/310

(Continued)

OTHER PUBLICATIONS

International Search Report, Application No. PCT/SE2014/050548, Oct. 16, 2014.

(Continued)

*Primary Examiner* — Edan Orgad
*Assistant Examiner* — Emmanuel Maglo
(74) *Attorney, Agent, or Firm* — Sage Patent Group

(57) ABSTRACT

A method in a network node for assigning resource blocks to a Mobile Station, MS, served by the network node. The MS is capable of downlink multicarrier operation. The network node receives from the MS an indication of a maximum number of consecutive downlink timeslots that the MS is capable of receiving on a given carrier during a TTI. The network node receives, from the MS, an indication of a maximum number of resource blocks that the MS is capable of processing during a TTI. The network node receives, from the MS, an indication of a maximum number of carriers supported by the MS. The network node assigns resource blocks to the MS, based on the received indication of a maximum number of consecutive downlink TS, the received indication of a maximum number of resource (Continued)

blocks and the received indication of a maximum number of carriers.

12 Claims, 12 Drawing Sheets

(58) Field of Classification Search
USPC .......................................................... 370/329
See application file for complete search history.

(56) References Cited

U.S. PATENT DOCUMENTS

| | | | |
|---|---|---|---|
| 8,374,156 B2* | 2/2013 | Yu | H04L 5/0007 370/252 |
| 9,173,197 B2* | 10/2015 | Dhanda | H04L 5/0048 |
| 2009/0022062 A1* | 1/2009 | Wang | H04W 36/0066 370/252 |
| 2009/0163158 A1* | 6/2009 | Chitrapu | H04W 52/262 455/127.5 |
| 2009/0296665 A1* | 12/2009 | Provvedi | H04W 8/24 370/336 |
| 2010/0015923 A1* | 1/2010 | Golitschek | H04L 1/0026 455/67.7 |
| 2011/0086656 A1* | 4/2011 | Zhou | H04W 8/24 455/507 |
| 2011/0255461 A1* | 10/2011 | Huang | H04W 72/1273 370/312 |
| 2012/0044898 A1* | 2/2012 | Ishii | H04W 52/146 370/329 |
| 2012/0213153 A1* | 8/2012 | Faurie | H04L 1/0026 370/328 |
| 2012/0314679 A1* | 12/2012 | Lee | H04L 5/0053 370/329 |
| 2013/0083753 A1* | 4/2013 | Lee | H04W 72/0453 370/329 |
| 2013/0121265 A1* | 5/2013 | Awoniyi | H04W 24/10 370/329 |
| 2013/0121268 A1* | 5/2013 | Li | H04W 28/20 370/329 |
| 2013/0150045 A1* | 6/2013 | Das | H04W 36/14 455/436 |
| 2014/0010170 A1* | 1/2014 | Das | H04L 5/0094 370/329 |
| 2014/0071901 A1* | 3/2014 | Sundberg | H04W 72/0453 370/329 |

OTHER PUBLICATIONS

Written Opinion of the International Searching Authority, Application No. PCT/SE2014/050548, dated Oct. 16, 2014.
Telefon LM AB LM Ericsson et al., "Draft CR 24.008 Introduction of Downlink Multi-Carrier", 3GPP Draft; GP-130127, 3GPP TSG-GERAN #57, Vienna, Austria, Feb. 25-Mar. 1, 2013, 15 pp.
Telefon LM AB LM Ericsson et al., "Introduction of Downlink Multi Carrier", 3GPP Draft; GP-121273, 3GPP TSG-GERAN Meeting #56, Prague, Czech Republic, Nov. 19-24, 2012, 11 pp.
Telefon AB LM Ericsson et al., "DLMC—Working Assumptions", 3GPP Draft; Tdoc GP-130241, 3GPP TSG GERAN #57, Vienna, Austria, Feb. 25-Mar. 1, 2013, 5 pp.

* cited by examiner

MOBILE STATION, NETWORK NODE, AND METHODS FOR ASSIGNING RESOURCE BLOCKS TO THE MOBILE STATION

CROSS REFERENCE TO RELATED APPLICATION

This application is a 35 U.S.C. §371 national stage application of PCT International Application No. PCT/SE2014/050548, filed on May 5, 2014, which itself claims priority to U.S. provisional Application No. 61/820,338, filed May 7, 2013, the disclosure and content of both of which are incorporated by reference herein in their entirety. The above-referenced PCT International Application was published in the English language as International Publication No. WO 2014/182225 A1 on Nov. 13, 2014.

TECHNICAL FIELD

Embodiments herein relate to a mobile station and a network node, and to methods in the mobile station and the network node. In particular they relate to assigning resource blocks to the mobile station.

BACKGROUND

Communication devices such as mobile stations (MS) are also known as e.g. user equipments (UE), terminals, mobile terminals, wireless terminals, and/or wireless devices. MSs are enabled to communicate wirelessly in a cellular communications network or wireless communication system, sometimes also referred to as a cellular radio system or cellular networks. The communication may be performed e.g. between two MSs, between a MS and a regular telephone and/or between a MS and a server via a Radio Access Network (RAN) and possibly one or more core networks, comprised within the cellular communications network.

MSs may further be referred to as mobile telephones, cellular telephones, laptops, tablet computers or surf plates with wireless capability, just to mention some further examples. The MSs in the present context may be, for example, portable, pocket-storable, hand-held, computer-comprised, or vehicle-mounted mobile devices, enabled to communicate voice and/or data, via the RAN, with another entity, such as another MS or a server.

The cellular communications network covers a geographical area which is divided into cell areas, wherein each cell area being served by a radio network node. A cell is the geographical area where radio coverage is provided by the radio network node.

The radio network node may e.g. be a base station such as a Radio Base Station (RBS), eNB, eNodeB, NodeB, B node, or Base Transceiver Station (BTS), depending on the technology and terminology used. The base stations may be of different classes such as e.g. macro eNodeB, home eNodeB or pico base station, based on transmission power and thereby also cell size.

Further, each radio network node may support one or several communication technologies. The radio network nodes communicate over the air interface operating on radio frequencies with the wireless terminals within range of the radio network node. In the context of this disclosure, the expression Downlink (DL) is used for the transmission path from the base station to the MS. The expression Uplink (UL) is used for the transmission path in the opposite direction i.e. from the MS to the base station.

With the rapid MS evolution, there is also a rapid increase in the need for additional processing power in the MSs to support more and more advanced radio network features, such as dual and multi-carrier reception.

A resource block comprises information transmitted within a limited time duration, using a fixed bandwidth in the frequency domain. The limited time duration is e.g. a given timeslot (TS) within a Time Division Multiple Access (TDMA) frame, where each TDMA frame is received within the context of repeated 52-multiframes in General Packet Radio Service (GPRS)/Enhanced Data rates for Global Evolution (EDGE) systems. The fixed bandwidth in the frequency domain is e.g. a radio frequency carrier that supports repeated 52-multiframes on one or more TS in GPRS/EDGE systems.

A MS will have the ability to process a certain maximum number of resource blocks based on the limitations of its processing power, e.g. 20 TSs received on a maximum of 8 radio frequency channels in GPRS/EDGE systems.

The processing power of the MS is typically signaled from the MS to the network in one way or the other. In a Global System for Mobile Communications (GSM) system the processing power is signaled to a Base Station Controller (BSC) and/or a Serving GPRS Support Node (SGSN).

Downlink Dual Carrier (DLDC) is a feature introducing two parallel carriers transmitted on the DL to the same MS. In DLDC, a single carrier transmission is extended to two separate carriers transmitted in parallel.

DLDC is limited to the reception of at most two carriers in the DL. The carriers are received in separate receivers and hence the performance of each carrier is identical to reception of one single carrier. The number of carriers is limited to two due to cost, complexity and size reasons. Adding more carriers implies adding more receive chains which will increase cost and complexity, but also the size of a receiving device, such as the MS.

A feature supporting multiple carriers on a DL, Downlink Multi Carrier (DLMC), is currently being standardized in Third Generation Partnership Project (3GPP) GSM/EDGE Radio Access Network (GERAN). DLMC utilizes a wide receiver filter and a single receive chain to simultaneously receive multiple carriers. Adding more carriers to the reception does not impost and implications on cost of the receiver and does not impact the size of the device. When using DLMC, the main limitation of the number of resources possible to process by a device, such as a MS, is its processing power.

In current GSM functionality, the number of DL resource blocks that can be simultaneously processed by an MS during each Transmission Time Interval (TTI), is determined by a signaled multislot class, a signaled maximum number of carriers supported, and a reduction parameter. The multislot class indicates the maximum number of DL timeslots that an MS can receive on a DL carrier during a TTI. The indicated maximum number of carriers supported is one or more of single carrier, dual carrier or multi carrier. Dual carrier and multi carrier are explicitly indicated, whereas single carrier does not require an explicit indication. The reduction parameter defines a reduction in the total number of TS and is currently indicated in an Information Element (IE) named Multislot Capability Reduction for Downlink Dual Carrier. The value of this parameter is subtracted from the product of the maximum number of DL TS according to the multislot class and the maximum number of carriers supported. A network node, such as a BSC will assign resource blocks to the MS, based on the above described signaled multislot class, maximum number of carriers and reduction parameter. This kind of capability signaling was developed in order to comply with DLDC operation.

SUMMARY

It is an object of embodiments herein to provide a way of improving resource block assignment to a MS which is capable of Downlink Multi Carrier operation.

According to a first aspect of embodiments herein, the object is achieved by a method in a network node for assigning resource blocks to a Mobile Station, MS. The MS is served by the network node. The MS is capable of downlink multicarrier operation. The network node receives from the MS, an indication of a maximum number of consecutive downlink timeslots that the MS is capable of receiving on a given carrier during a Transmission Time Interval, TTI. The network node further receives, from the MS, an indication of a maximum number of resource blocks that the MS is capable of processing during a TTI. The network node further receives, from the MS, an indication of a maximum number of carriers supported by the MS. The network node assigns resource blocks to the MS. The assigning is based on the received indication of a maximum number of consecutive downlink TS, on the received indication of a maximum number of resource blocks and on the received indication of a maximum number of carriers.

According to a second aspect of embodiments herein, the object is achieved by a network node for assigning resource blocks to a Mobile Station, MS. The MS is served by the network node. The MS is capable of downlink multicarrier operation. The network node is configured to receive, from the MS, an indication of a maximum number of during a Transmission Time Interval, TTI. The network node is further configured to receive, from the MS, an indication of a maximum number of resource blocks that the MS is capable of processing during a TTI. The network node is further configured to receive, from the MS, an indication of a maximum number of carriers supported by the MS. The network node is further configured to assign resource blocks to the MS. The assigning is based on the received indication of a maximum number of consecutive downlink TS, on the received indication of a maximum number of resource blocks and on the received indication of a maximum number of carriers.

According to a third aspect of embodiments herein, the object is achieved by a method in a Mobile Station, MS, for handling assignment of resource blocks. The MS is served by a network node. The MS is capable of downlink multi-carrier operation. The MS signals, to the network node, an indication of a maximum number of consecutive downlink timeslots that the MS is capable of receiving on a given carrier during a Transmission Time Interval, TTI. The MS signals, to the network node, an indication of a maximum number of resource blocks that the MS is capable of processing during a TTI. The MS signals, to the network node, an indication of a maximum number of carriers supported by the MS. The MS receives from the network node, an assignment of resource blocks. The assignment is based on the signaled indication of a maximum number of consecutive downlink TS, on the signaled indication of a maximum number of resource blocks and on the signaled indication of a maximum number of carriers.

According to a fourth aspect of embodiments herein, the object is achieved by a Mobile Station, MS, for handling assignment of resource blocks. The MS is served by a network node. The MS is capable of downlink multicarrier operation. The MS is configured to signal, to the network node, an indication of a maximum number of consecutive downlink timeslots that the MS is capable of receiving on a given carrier during a Transmission Time Interval, TTI. The MS is further configured to signal, to the network node, an indication of a maximum number of resource blocks that the MS is capable of processing during a TTI. The MS is further configured to signal, to the network node, an indication of a maximum number of carriers supported by the MS. The MS is further configured to receive, from the network node, an assignment of resource blocks, which assignment is based on the signaled indication of a maximum number of consecutive downlink TS, on the signaled indication of a maximum number of resource blocks and on the signaled indication of a maximum number of carriers.

Since a maximum number of resource blocks which is independent of the maximum number of carriers is signaled, an appropriate maximum number of carriers may be signaled. This allows the network to not only utilize the time domain in assigning timeslots to the MS on a single, or two carriers, but can also make full use of the frequency domain by letting the MS receive a high number of radio frequency channels simultaneously.

An advantage with embodiments herein is thus that the network node may assign resource blocks to the MS in a more flexible way than what would have been the case if the assigned resources would be coupled to a fixed number of radio frequency channels, as is done for data services in GSM today, both for legacy GSM operation but also when using reception of multiple simultaneous carriers with the downlink dual carrier, DLDC, feature. If the DLDC adapted capacity signaling described above would have been used for the DLMC case, the maximum number of carriers signaled by the MS could have been lower than the actual capabilities of the MS. The network node would in that case assign resources on at most two radio frequency channels and would calculate the MS's maximum number of resource blocks in a predetermined manner, from a signaled timeslot reduction factor. This signaling would limit the flexibility of assigning resources and effectively reduce the user experience.

BRIEF DESCRIPTION OF THE DRAWINGS

Examples of embodiments herein are described in more detail with reference to the attached drawings in which.

DETAILED DESCRIPTION

As part of developing embodiments herein, some problems will first be identified and discussed.

Figure 1:
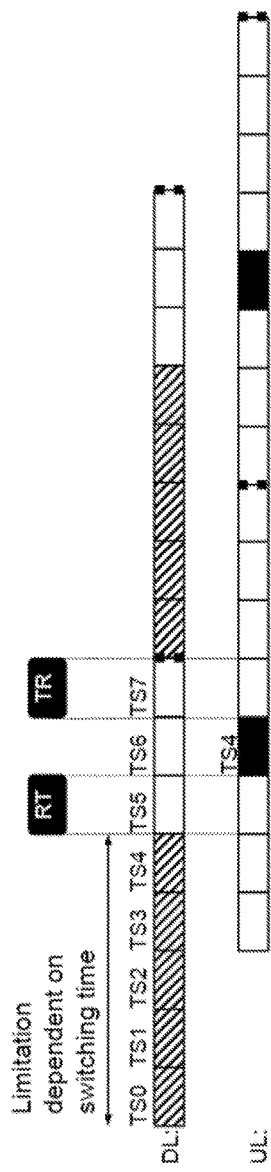
FIG. 1 illustrates an exemplary resource block assignment in single carrier operation.

FIG. 1 illustrates how resource blocks may be assigned in single carrier operation. The maximum number of DL timeslots that an MS can receive on a DL carrier during a TTI is limited by the switching time capabilities of the MS, i.e. switching between transmission and reception. In FIG. 1, striped boxes indicate timeslots assigned for DL traffic. Black boxes indicate timeslots assigned for UL traffic. RT denotes switching time between receiving (Rx) and transmitting (Tx). TR denotes switching time between Tx and Rx.

Figure 2:
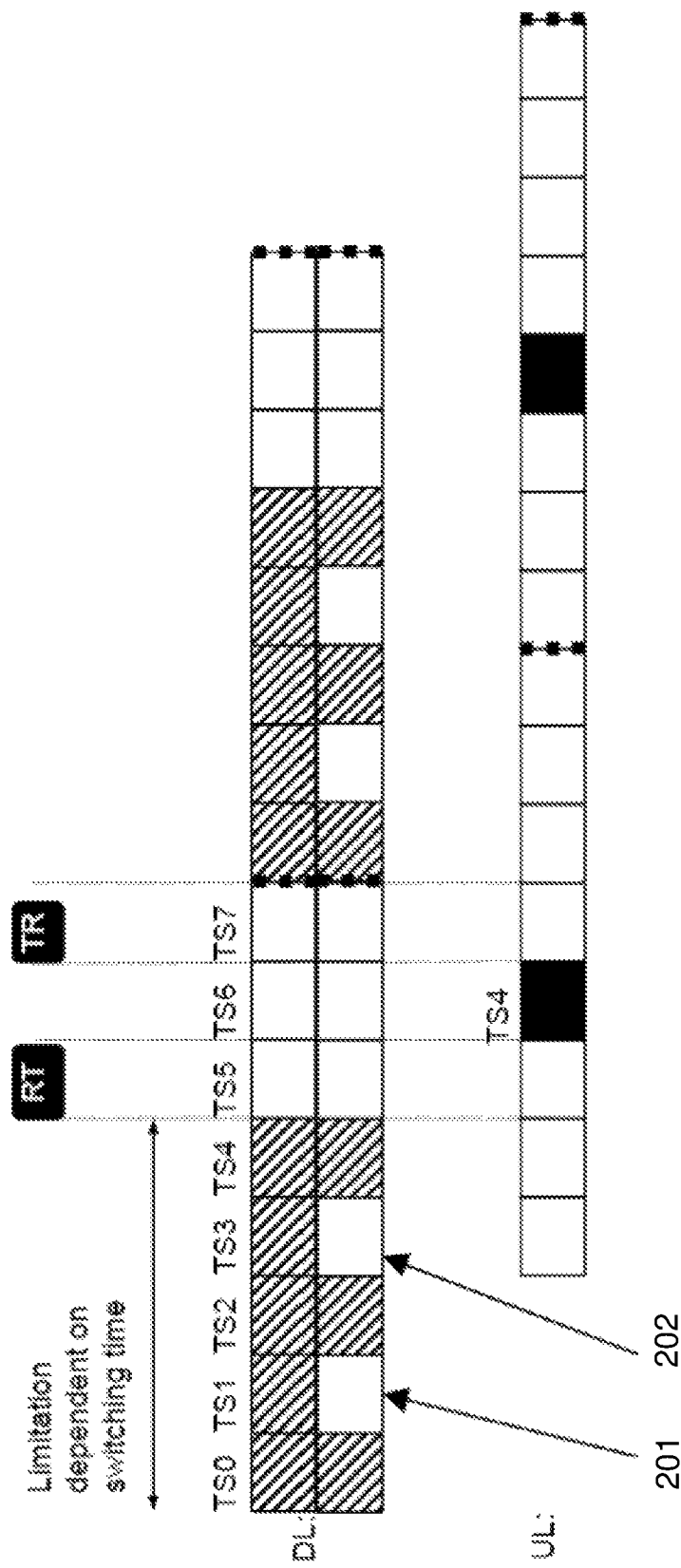
FIG. 2 illustrates an exemplary resource block assignment in DLDC operation.

FIG. 2 illustrates how resource blocks may be assigned in DLDC operation, according to current GSM functionality. The number of DL resource blocks that can be simultaneously processed by an MS during each TTI is then determined by a signaled multislot class, a signaled maximum number of carriers supported, and a signaled reduction parameter. The multislot class indicates the maximum number of DL timeslots that an MS can receive on a DL carrier during a TTI, and is limited by the switching time capabilities of the MS, i.e. switching between transmission and reception. The indicated maximum number of carriers supported is one or more of single carrier, dual carrier or multi carrier. Dual carrier and multi carrier are explicitly indicated, whereas single carrier does not require an explicit indication. The reduction parameter defines a reduction in the total number of timeslots and is currently indicated in an IE named Multislot Capability Reduction for Downlink Dual Carrier. The value of this parameter is subtracted from the product of the maximum number of DL timeslots according to the multislot class and the maximum number of carriers supported. The maximum number of carriers and the multislot capability reduction are related to the baseband processing power, such as how many TSs that can simultaneously be processed by the MS within one and the same TTI.

A network node will assign resource blocks to the MS, based on the above described signaled multislot class, maximum number of carriers and reduction parameter. This kind of capability signaling was developed in order to comply with DLDC operation.

As an example, an MS may signal a multislot class implying a capability of receiving up to 5 consecutive TS in the DL on a given carrier, and a Multislot Capability Reduction for Downlink Dual Carrier of 2. By signaling a multislot capability reduction, the MS implicitly signals support of the DLDC feature. This capacity signaling tells the network that the MS is capable of processing resources spread on 5 TS multiplied by 2 carriers, minus 2 TS due to the multislot capacity reduction, i.e. 8 TS on the DL, during a TTI. The network may then assign resources to the MS e.g. as shown in FIG. 2, in which striped boxes indicate timeslots assigned for DL traffic, black boxes indicate timeslots assigned for UL traffic. RT denotes switching time between receiving (Rx) and transmitting (Tx). TR denotes switching time between Tx and Rx. Two TS 201, 202 are not assigned since the MS according to this example has indicated a multislot capability reduction of 2 TS.

If the above described signaling from the MS is extended from DLDC to DLMC operation, a MS supporting DLMC would have to signal a multislot class, a maximum number of carriers and a multislot capability reduction. There are several drawbacks with applying this DLDC signaling approach to the DLMC case:

Firstly, in order to allocate the maximum number of TS on the DL, so as to achieve maximum throughput, the signaled information must indicate a maximum number of carriers such that, when multiplied by the maximum number of TS per carrier corresponding to the signaled multislot class, the product does not exceed the maximum number of TS the MS can process simultaneously by more than "maximum number of TS per DL carrier". This requirement is due to that the largest number of TS that can be indicated by the multislot capability reduction is limited to "maximum number of TS per DL carrier". This has the net impact of forcing the network, such as a Base Station Subsystem (BSS), comprising a BTS and a Base Station Controller (BSC), to allocate the maximum number of TS on the DL over the smallest number of DL carriers minus 1 and thereby imposes a restriction in the assignment flexibility of the network. A situation may then occur in which the MS could potentially support the maximum number of TS it can process simultaneously on more than the maximum number of carriers it has signaled. That is, the maximum number of carriers signaled by the MS may in this case be lower than the actual capabilities of the MS.

Secondly, when the BSS has been forced to assign TSs according to above description, increasing the number of UL TS assigned for an UL Temporary Block Flow (TBF) beyond 1 will impose a corresponding reduction to the maximum number of TS on the DL that can be assigned, for each DL carrier, and thereby eliminate any possibility of the network node ever realizing the maximum number of TS it can process on the DL simultaneously in the same radio block period, whenever 2 or more TS are assigned to the UL TBF.

Figure 3:
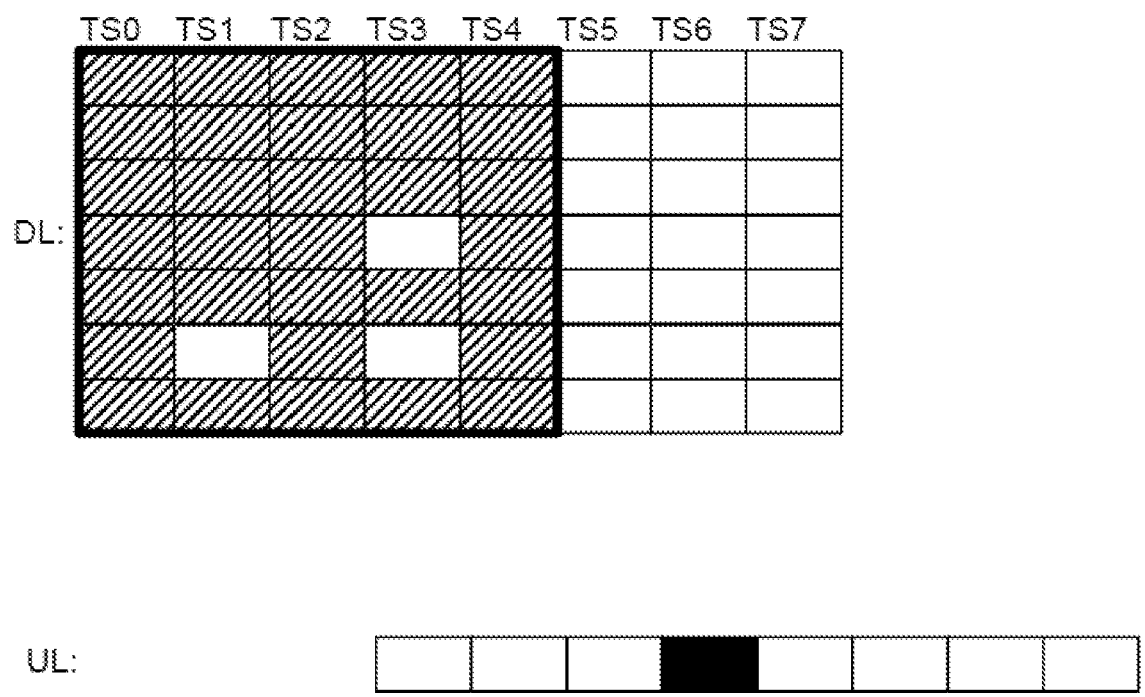
FIG. 3 illustrates an exemplary resource block assignment in multi carrier operation, which resource block assignment is based on capacity signaling adapted for DLDC operation.

The problem of applying the legacy functionality to multi carrier operation is further illustrated in FIG. 3. Assuming a baseband processing power of 32 resource blocks and a multislot capability of 5 consecutive TS, a capability of 7 carriers will have to be signaled, due to the limited flexibility of the signaling, even if the MS is in fact capable of processing the 32 resource blocks on more than 7 carriers. The MS will signal a multislot capability reduction of 3, such that 3 is subtracted from 35—the product of 5 TS and 7 carriers—in order to secure that a capacity of 32 resource blocks is signaled. Resources may thus be assigned freely within the frame indicated in FIG. 3. In FIG. 3, striped boxes indicate timeslots assigned for DL traffic, black boxes indicate timeslots assigned for UL traffic, and the blank boxes within the frame denote TS which are not assigned due to the indicated multislot capability reduction of 3. As described above, the value of the multislot capability reduction must not be higher than the maximum number of TS per DL carrier, which is 5 in this case. According to this kind of DLDC adapted signaling, a MS with a multislot capability of 5 TS and a capacity of 32 resource blocks, could not have signaled a capacity of e.g. 8 carriers, since the MS would then have had to indicate a multislot capability reduction of 8, which is higher than 5, the maximum number or TS per DL carrier, and thus not allowed. Accordingly, using this kind of DLDC adapted signaling in DLMC operation implies that a MS capable of processing a certain number of carriers simultaneously may be forced to indicate a lower maximum number of carriers due to the signaling limitations.

Figure 4:
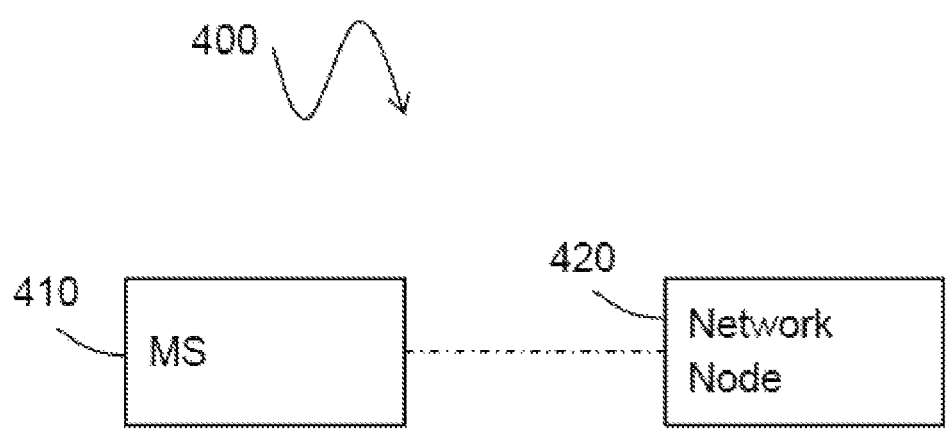
FIG. 4 schematically illustrates embodiments of a wireless communications network.

FIG. 4 depicts an example of a network 400 in which embodiments herein may be implemented. The network 400 may be a GSM network or any other wireless communications network in which embodiments herein may be implemented.

A MS 410 operates in the network 400. The MS 410 may e.g. be a mobile terminal. The MS 410 may also be a laptop, a tablet computer or a surf plate with wireless capability, just to mention some further examples. The MS 410 in the present context may be, for example, portable, pocket-storable, hand-held, computer-comprised, or vehicle-mounted mobile devices, enabled to communicate voice and/or data, via the RAN, with another entity, such as another mobile station or a server.

Figure 5:
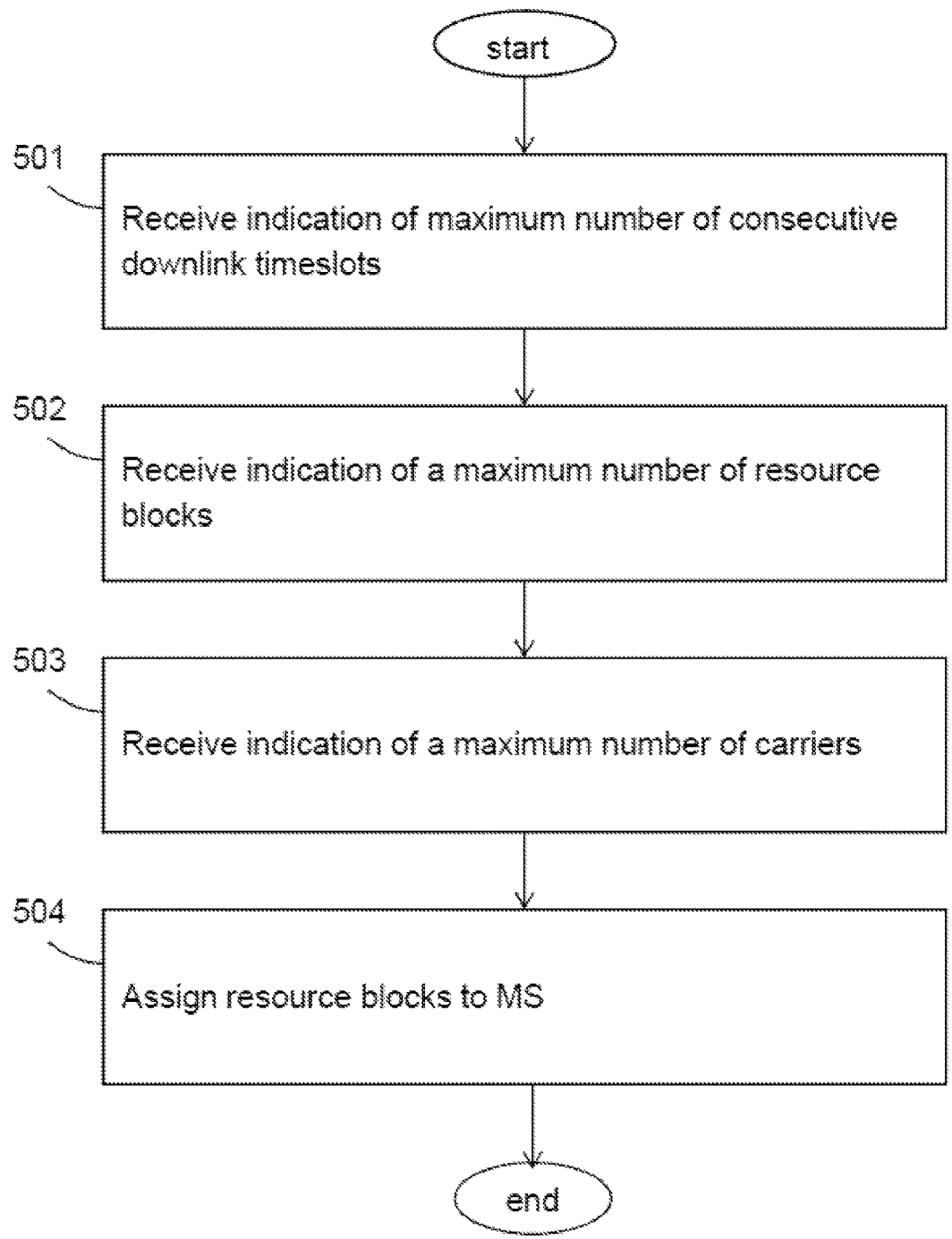
FIG. 5 is a flowchart depicting embodiments of a method in a network node.

The MS 410 has access to a network node 420 via a radio air interface. The network node 420 may e.g. be a BSC or a SGSN. The network node 420 may also be base station, such as a BTS, a RBS, a NB or an eNB Example embodiments of a method in the network node 420 for assigning resource blocks to a MS 410, served by the network node 420, will now be described with reference to a flowchart depicted in FIG. 5. The method comprises the following actions, which actions may be taken in any suitable order. First, the method is described in a general way, here as seen from the network node's 420 point of view, relating to FIG. 5. Then, the method will be described as seen from the MS's 410 point of view, relating to FIG. 6. The method will then be described in more detail below.

According to embodiments herein, the MS 410 is capable of DLMC operation.

Action 501

The network node 420 receives, from the MS 410, an indication of a maximum number of consecutive downlink timeslots that the MS 410 is capable of receiving on a given carrier during a Transmission Time Interval, TTI. The maximum number of consecutive downlink timeslots that the MS 410 is capable of receiving may be signaled by means of indicating a multislot class of the MS.

Action 502

The network node 420 receives, from the MS 410, an indication of a maximum number of resource blocks that the MS 410 is capable of processing during a TTI. The maximum number of resource blocks may be indicated independently of a maximum number of carriers.

In some embodiments the indication of a maximum number of resource blocks that the MS 410 is capable of processing during a TTI, is dependent on a modulation used. This means that the capacity signaling also allows for a feature dependent signalling. The maximum number of resource blocks signaled may then be dependent on a feature used on the resources, so that, for example, different values for the maximum number of resource blocks supported could be indicated depending on the modulation used. This means that multiple values for the maximum number of resource blocks supported could be signaled indicating MS capability on a per feature set, or feature set combination, basis.

Action 503

The network node 420 further receives, from the MS 410, an indication of a maximum number of carriers supported by the MS 410.

In some embodiments, the maximum number of carriers supported by the MS 410 is indicated in at least one of a MS Radio Access Capability information element, and a MS Classmark 3 information element. In that way, information elements already used in GSM for MS capability signaling are re-used.

Action 504

According to embodiments herein, the network node 420 assigns resource blocks to the MS 410. The assigning is based on the received indication of a maximum number of consecutive downlink TS, on the received indication of a maximum number of resource blocks and on the received indication of a maximum number of carriers.

Since the maximum number of carriers is independent of the maximum number of resource blocks, the network node 420 may assign resources to the MS 410 in a more flexible way than if DLDC adapted capacity signaling would have been used. Then the full capacity of the MS may be used, e.g. such that resources may be assigned on all the carriers the MS is capable of processing simultaneously.

Figure 6:
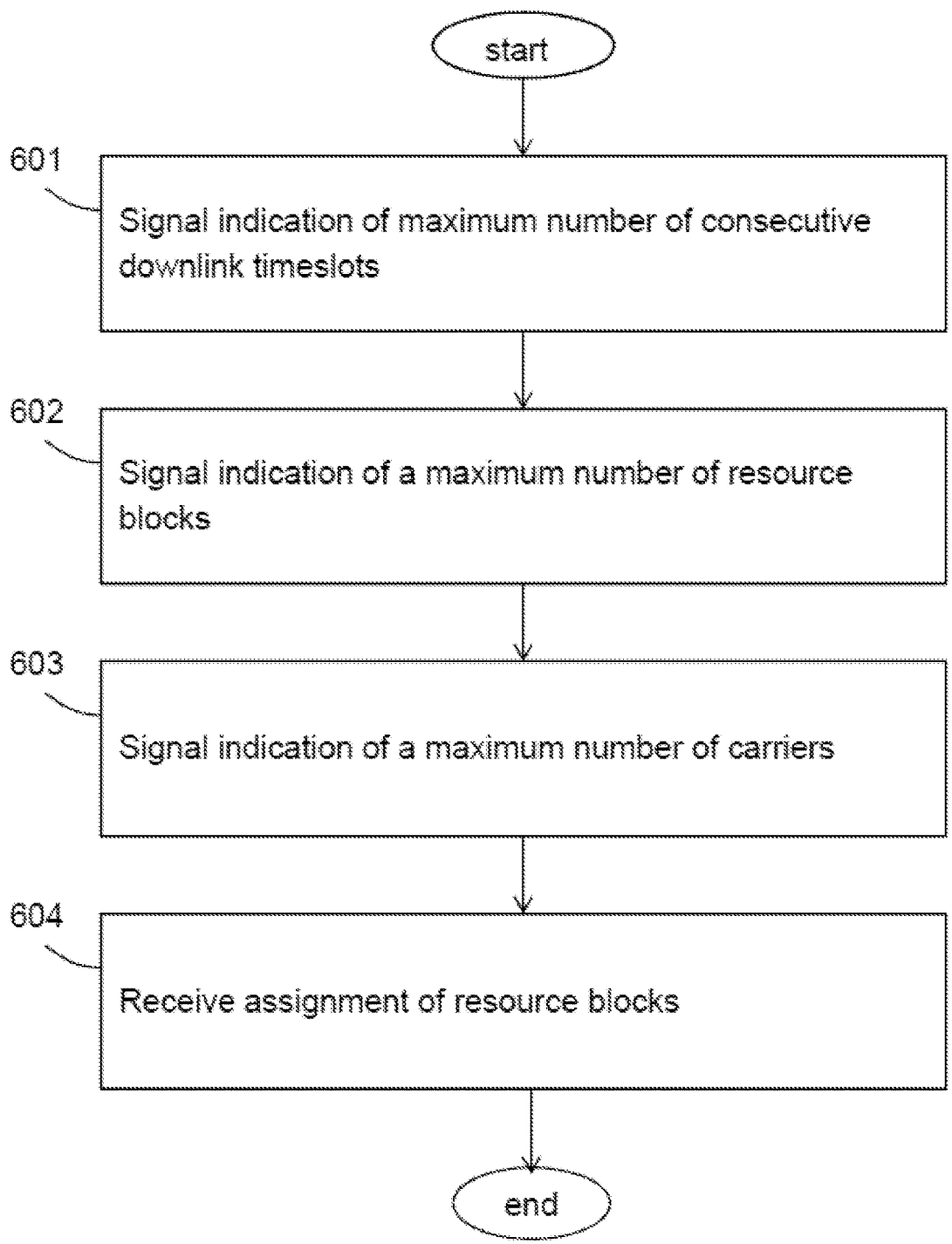
FIG. 6 is a flowchart depicting embodiments of a method in a MS.

Example embodiments of a method in the MS 410 for handling assignment of resource blocks to the MS 410, will now be described with reference to a flowchart depicted in FIG. 6.

The MS 410 is served by the network node 420, and is capable of DLMC operation.

Action 601

The MS 410 signals, to the network node 420, an indication of a maximum number of consecutive downlink timeslots that the MS 410 is capable of receiving on a given carrier during a Transmission Time Interval, TTI. The maximum number of consecutive downlink timeslots that the MS 410 is capable of receiving may be signaled by means of indicating a multislot class of the MS. There may be no change in the multislot class signaled by the MS, as compared to a DLDC adapted capacity signaling, since the indicated multislot class is related to the switching times of the MS, which is not expected to change for an MS supporting Downlink Multicarrier, DLMC.

Action 602

The MS 410 signals, to the network node 420, an indication of a maximum number of resource blocks that the MS 410 is capable of processing during a TTI. The maximum number of resource blocks may be indicated independently of a maximum number of carriers.

In some embodiments the indication of a maximum number of resource blocks that the MS 410 is capable of processing during a TTI, is dependent on a modulation used. This means that the capacity signaling also allows for a feature dependent signaling. The maximum number of resource blocks signaled may then be dependent on a feature used on the resources, so that, for example, different values for the maximum number of resource blocks supported could be indicated depending on the modulation used. This means that multiple values for the maximum number of resource blocks supported could be signaled indicating MS capability on a per feature set, or feature set combination, basis.

Action 603

The MS 410 further signals, to the network node 420, an indication of a maximum number of carriers supported by the MS 410.

In some embodiments, the maximum number of carriers supported by the MS 410 is indicated in at least one of a MS Radio Access Capability information element, and a MS Classmark 3 information element. In that way, information elements already used in GSM for MS capability signaling are used.

Action 604

According to embodiments herein, the MS 410 receives, from the network node 420, an assignment of resource blocks. The assigning is based on the received indication of a maximum number of consecutive downlink TS, on the received indication of a maximum number of resource blocks and on the received indication of a maximum number of carriers.

Since the maximum number of carriers is independent of the maximum number of resource blocks, the network node 420 may assign resources to the MS 410 in a more flexible way than if DLDC adapted capacity signaling would have been used.

Various details of some possible embodiments are discussed below.

Figure 7:
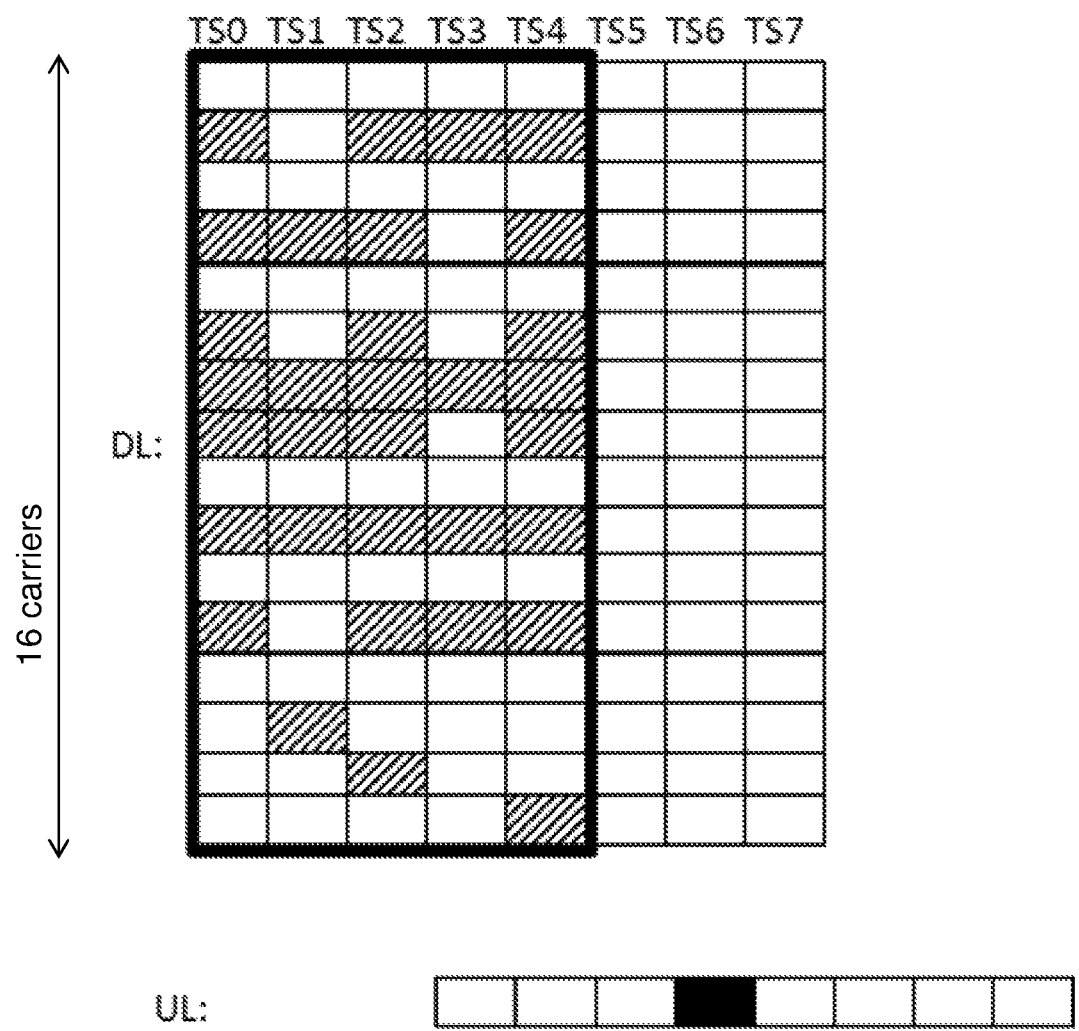
FIG. 7 illustrates an exemplary resource block assignment in DLMC operation, according to embodiments herein.

FIG. 7 depicts an example of how resource blocks may be assigned to an MS 410 which has signaled its capacity in accordance with embodiments herein. In the exemplary embodiment depicted in FIG. 7, the MS has signaled a maximum number of carriers of 16, a maximum number of resource blocks of 32 and a multislot class indicative of a maximum of 5 consecutive downlink timeslots during a TTI. The network node 420 may then assign resource blocks to the MS 410 freely within the frame indicated in FIG. 7. In FIG. 7, striped boxes indicate timeslots assigned for DL traffic, black boxes indicate timeslots assigned for UL traffic, and the blank boxes denote TS which are not assigned.

As can be seen from a comparison between FIG. 3 and FIG. 7, allowing a larger number of carriers to be used—as in FIG. 7 although the same maximum number of resource blocks is supported in FIG. 3 and in FIG. 7—will allow the network, such as the network node 420, to have more flexibility in what resource blocks to assign to the MS 410. In the legacy case, using DLDC adapted capacity signaling as in FIG. 3, the network can choose 32 assignments out of 35 while for the exemplary embodiment shown in FIG. 7, 32 assignments out of 80 can be chosen.

FIG. 8, FIG. 9, FIG. 10 and FIG. 11 illustrate a further advantage with embodiments herein. As compared to a DLDC adapted capacity signaling, embodiments herein enables an increased number of UL TS that can be assigned, while at the same time keeping the maximum DL throughput that can be realized unchanged.

An increased UL bandwidth assignment may be achieved without reducing the DL bandwidth since increasing the number of UL TS assigned beyond 1 will no longer impose a corresponding reduction to the maximum number of resource blocks that can be assigned per DL carrier (i.e. the network node may assign more than 1 UL TS for the UL TBF and still be able to realize the maximum number of resource blocks supported by the MS on the DL.

In FIG. 8, FIG. 9, FIG. 10 and FIG. 11, the improved ability for the network node to assign bandwidth on the UL, i.e. without necessitating a corresponding reduction in DL bandwidth, is shown. The same 32 blocks, i.e. the maximum number of resource blocks, may be scheduled on the DL for all 4 UL assignment cases shown in FIG. 8, FIG. 9, FIG. 10 and FIG. 11, while allowing for a flexibility of 1-4 TS on the UL to be assigned for UL traffic.

Figure 8:
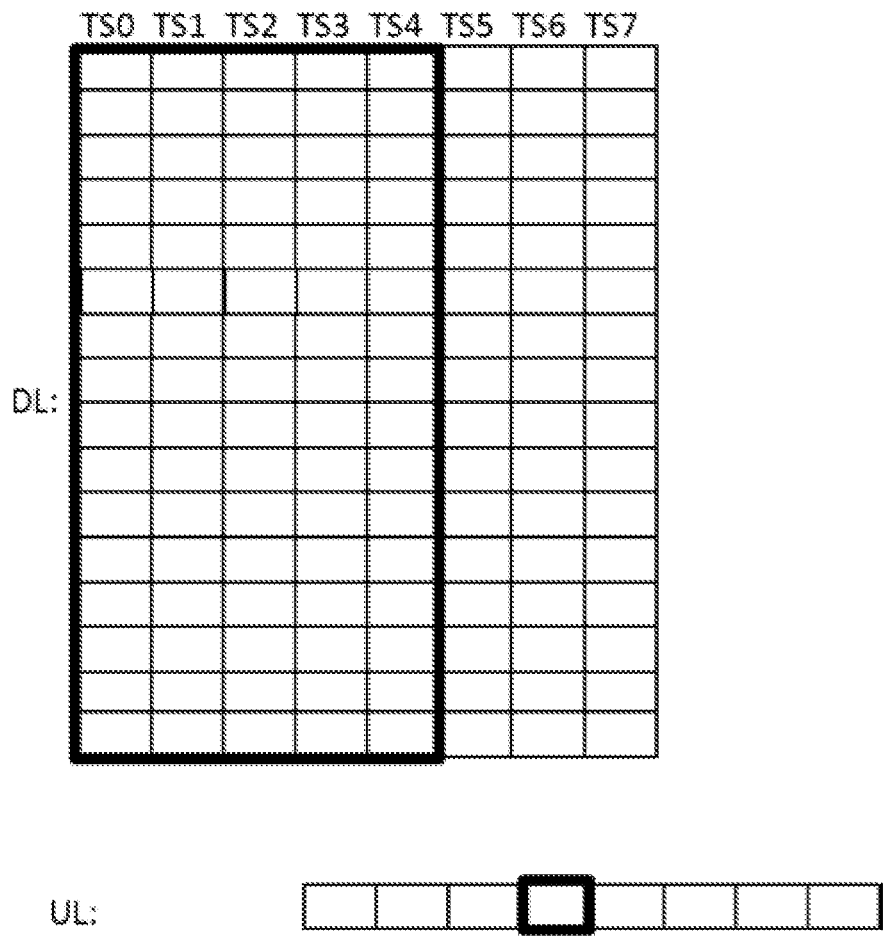
FIG. 8 illustrates embodiments of how resource blocks may be assigned on the DL, when one timeslot is assigned for UL traffic.

In FIG. 8, 1 TS is assigned on the UL, and assuming a capability of 32 resource blocks and a maximum number of carriers of 16 on the DL, the network node may assign resources freely within the frame indicated in FIG. 8.

Figure 9:
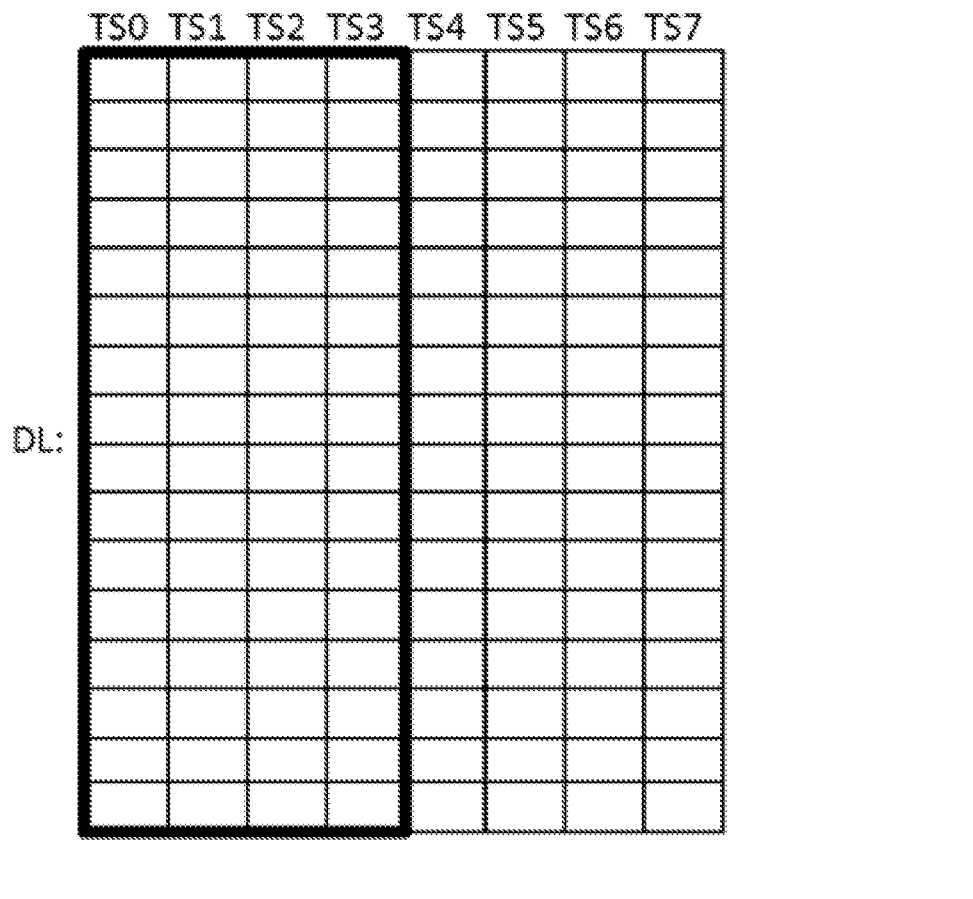
FIG. 9 illustrates embodiments of how resource blocks may be assigned on the DL, when two timeslots are assigned for UL traffic.

In FIG. 9, 2 TSs are assigned on the UL, and assuming a capability of 32 resource blocks and a maximum number of carriers of 16 on the DL, the network node may assign resources freely within the frame indicated in FIG. 9.

Figure 10:
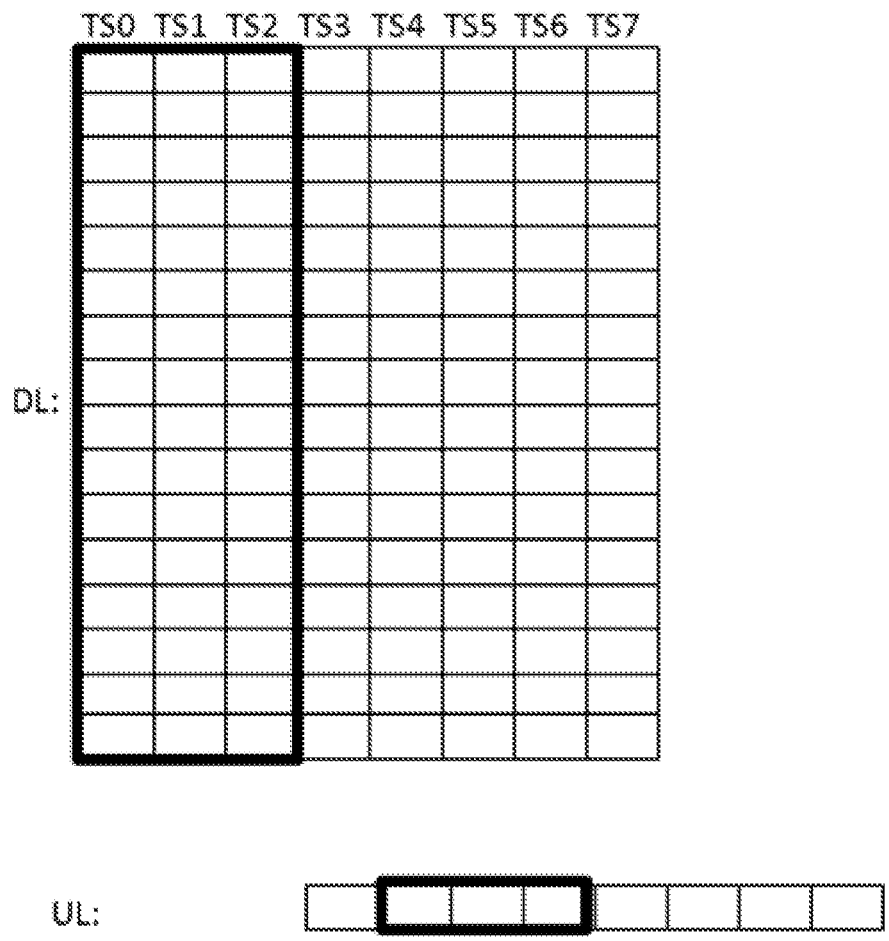
FIG. 10 illustrates embodiments of how resource blocks may be assigned on the DL, when three timeslots are assigned for UL traffic.

In FIG. 10, 3 TSs are assigned on the UL, and assuming a capability of 32 resource blocks and a maximum number of carriers of 16 on the DL, the network node may assign resources freely within the frame indicated in FIG. 10.

Figure 11:
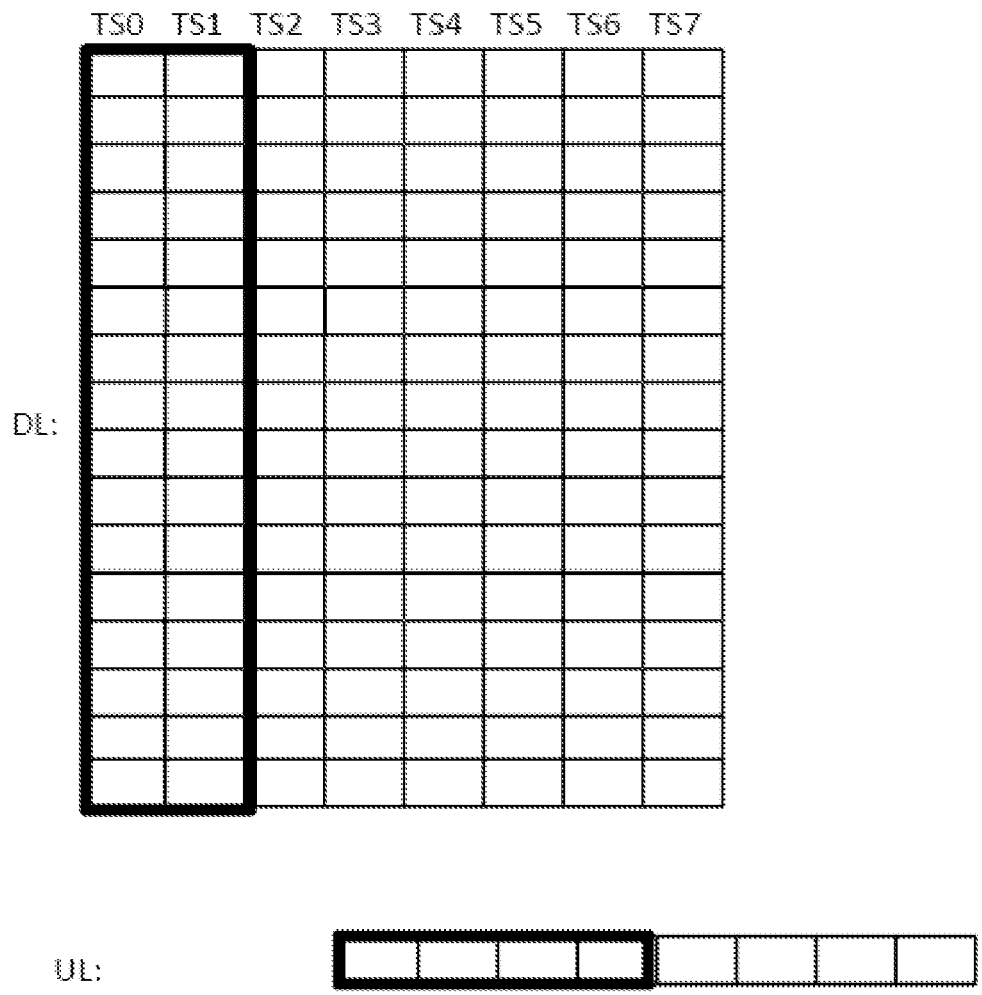
FIG. 11 illustrates embodiments of how resource blocks may be assigned on the DL, when four timeslots are assigned for UL traffic.

In FIG. 11, 4 TSs are assigned on the UL, and assuming a capability of 32 resource blocks and a maximum number of carriers of 16 on the DL, the network node may assign resources freely within the frame indicated in FIG. 11.

It is thus to be noted that although the assignment flexibility is progressively reduced on the DL as additional TS are assigned on the UL, e.g. "32 TS DL and 4 TS UL" as shown in FIG. 11, the increased UL bandwidth might be needed on a temporary basis to avoid stalling of a Radio Link Control (RLC) protocol by allowing an increased volume of Ack/Nack information to be transmitted.

A further advantage with embodiments herein is that the MS may utilize the maximum available baseband processing power through appropriate signaling to the network when some of the processing power voracious features, such as Mobile Station Receive Diversity (MSRD) and Voice services over Adaptive Multi-user channels on One Slot (VAMOS), are supported by that MS, but not used during that time.

A further advantage with embodiment herein is that a single capability indicator defining the maximum number of resource blocks that can be processed by the mobile on the DL may be signaled.

In other words, it is to be noted that this single value would apply irrespective of the feature or feature combinations used. For example, today for DLDC, an additional Multislot capability reduction for an Enhanced Flexible Timeslot Assignment (EFTA) feature is needed since EFTA allows for more resources in the DL to be assigned. However, if only a single value is provided for indicating the maximum number of resource blocks that can be processed, no EFTA specific IE is needed since the same value for maximum number of resource blocks would also apply in EFTA operation. When signaling a single value for this parameter the MS could, in an implementation specific manner, factor in the most processing intense feature or feature set combinations it supports for which it can be assigned the largest value for the maximum number of resource blocks and still not exceed its processing capabilities. The granularity of the signaled indication can be chosen to suit current MS implementations. One alternative could for example be to allow for a granularity of 2 TS, starting from 6 TS in total.

Maximum number of resource blocks=[6, 8, 10, 12, 14 . . . 128]

There is no need to start from a number lower than 5, which would indicate less baseband power than for a single carrier MS. Also, the maximum value need not be higher than 8*[max carriers], in this example 8*16=128, since the TDMA frame structure in GSM is limited to 8 TS.

The maximum number of downlink timeslots possible to support may be from 6 TS up to 128 TS with an increment of 2 TS, i.e. [6, 8, 10, 12, 14, . . . ]

Examples of how to code the maximum number of downlink timeslots is shown below:

Bits 1 2 3 4 5 6

0 0 0 0 0 0 Maximum number of downlink timeslots: 2

0 0 0 0 0 1 Maximum number of downlink timeslots: 4

1 1 1 1 0 0 Maximum number of downlink timeslots: 128
1 1 1 1 0 1 Reserved
1 1 1 1 1 1 Reserved Naturally, the MS which is disclosed herein is capable not only of signaling the capabilities in question, but which also has these capabilities.

Figure 12:
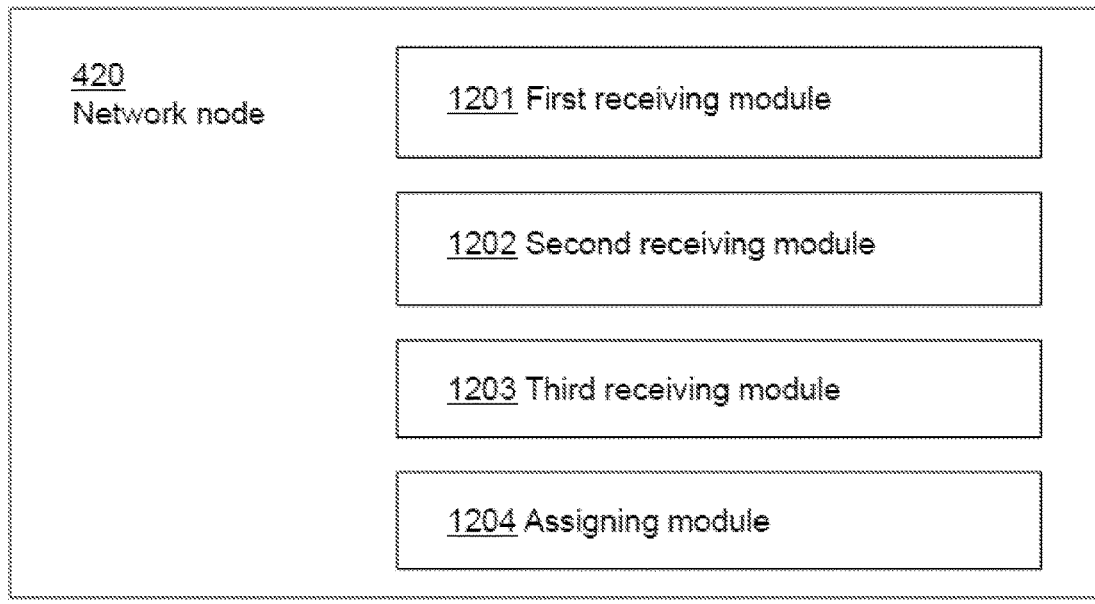
FIG. 12 is a schematic block diagram illustrating embodiments of a network node.

The network node 420 for assigning resource blocks to a Mobile Station, MS, 410 served by the network node 420, as described above in relation to FIG. 5, is depicted in FIG. 12. The MS 410 is capable of downlink multicarrier operation, The network node 420 is configured to receive from the MS 410, an indication of a maximum number of consecutive downlink timeslots that the MS is capable of receiving on a given carrier during a Transmission Time Interval, TTI, In some embodiments, the network node 420 comprises a first receiving module 1201, configured to receive the indication of a maximum number of consecutive downlink timeslots. The first receiving module 1201 may be comprised in a receiver circuit of the network node 420.

The network node 420 is further configured to receive, from the MS 410, an indication of a maximum number of resource blocks that the MS 410 is capable of processing during a TTI.

In some embodiments, the network node 420 comprises a second receiving module 1202, configured to receive the indication of a maximum number of resource blocks. The second receiving module 1202 may be comprised in a receiver circuit of the network node 420.

In some embodiments, the indication of the maximum number of resource blocks that the MS 410 is capable of processing during a TTI, is dependent on a modulation used.

The network node 420 is further configured to receive, from the MS 410, an indication of a maximum number of carriers supported by the MS 410.

In some embodiments, the network node 420 comprises a third receiving module 1203, configured to receive the indication of a maximum number of carriers supported by the MS. The third receiving module 1203 may be comprised in a receiver circuit of the network node 420.

In some embodiments, the maximum number of carriers supported by the MS 410 is indicated in at least one of a MS Radio Access Capability information element, and a MS Classmark 3 information element.

The network node 420 is further configured to assign resource blocks to the MS 410. The assigning is based on the received indication of a maximum number of consecutive downlink TS, on the received indication of a maximum number of resource blocks and on the received indication of a maximum number of carriers.

In some embodiments, the network node 420 comprises an assigning module 1204, configured to assign resource blocks to the MS. The assigning module 1204 may be comprised in a transmitter circuit of the network node 420.

Figure 13:
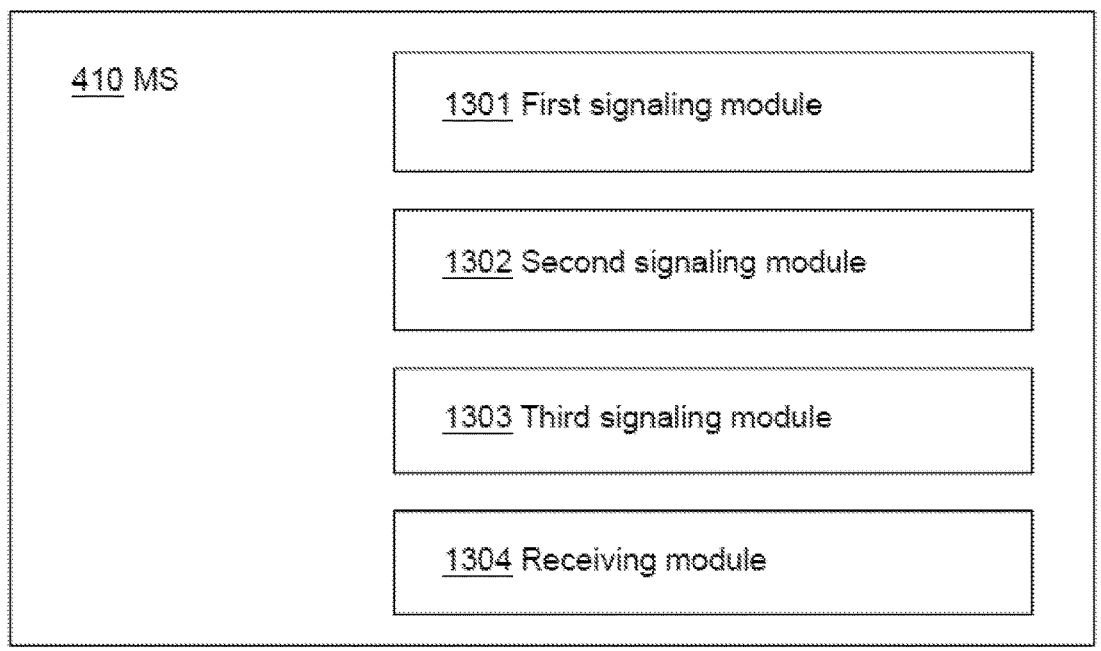
FIG. 13 is a schematic block diagram illustrating embodiments of a MS.

The MS 410 for handling assignment of resource blocks, as described above in relation to FIG. 6, is depicted in FIG. 13. The MS 410 is capable of downlink multicarrier operation, and is served by the network node 420, The MS 410 is configured to signal, to the network node 420, an indication of a maximum number of consecutive downlink timeslots that the MS is capable of receiving on a given carrier during a Transmission Time Interval, TTI.

In some embodiments, the MS 410 comprises a first signaling module 1301, configured to signal the indication of a maximum number of consecutive downlink timeslots. The first signaling module 1301 may be comprised in a transmitting circuit of the MS 410.

The MS 410 is further configured to signal, to the network node 420, an indication of a maximum number of resource blocks that the MS 410 is capable of processing during a TTI.

In some embodiments, the MS 410 comprises a second signaling module 1302, configured to signal the indication of a maximum number of resource blocks. The second signaling module 1302 may be comprised in a transmitting circuit of the MS 410.

In some embodiments, the indication of the maximum number of resource blocks that the MS 410 is capable of processing during a TTI, is dependent on a modulation used.

The MS 410 is further configured to signal, to the network node 420, an indication of a maximum number of carriers supported by the MS 410.

In some embodiments, the MS 410 comprises a third signaling module 1303, configured to signal the indication of a maximum number of carriers supported by the MS.

The third signaling module 1303 may be comprised in a transmitting circuit of the MS 410.

In some embodiments, the maximum number of carriers supported by the MS 410 is indicated in at least one of a MS Radio Access Capability information element, and a MS Classmark 3 information element.

The MS 410 is further configured to receive an assignment of resource blocks from the network node 420. The assigning is based on the signaled indication of a maximum number of consecutive downlink TS, on the signaled indication of a maximum number of resource blocks and on the signaled indication of a maximum number of carriers.

In some embodiments, the MS 410 comprises a receiving module 1304, configured to receive the assignment of resource blocks. The receiving module 1304 may be comprised in a receiver circuit of the MS 410.

The present invention may, of course, be carried out in other specific ways than those herein set forth without departing from the scope and essential characteristics of the invention. The present embodiments are, therefore, to be considered in all respects as illustrative and not restrictive.

The invention claimed is:

1. A method in a network node for assigning resource blocks to a Mobile Station, MS, served by the network node, wherein the MS is capable of downlink multicarrier operation, the method comprising:
   receiving from the MS, an indication of a maximum number of consecutive downlink timeslots that the MS is capable of receiving on a given carrier during a Transmission Time Interval, TTI,
   receiving, from the MS, an indication of a maximum number of resource blocks that the MS is capable of processing during a TTI,
   receiving from the MS an indication of a maximum number of carriers supported by the MS,
   assigning resource blocks to the MS, wherein the assigning is based on the received indication of a maximum number of consecutive downlink TS, on the received indication of a maximum number of resource blocks and on the received indication of a maximum number of carriers; and
   increasing an uplink bandwidth without reducing a downlink bandwidth responsive to assigning the resource blocks to the MS,
   wherein each of the resource blocks comprise information transmitted within a defined time duration and using a fixed bandwidth.

2. The method according to claim 1, wherein the maximum number of carriers supported by the MS is indicated in at least one of:
a MS Radio Access Capability information element, and
a MS Classmark 3 information element.

3. The method according to claim 1, wherein the indication of a maximum number of resource blocks that the MS is capable of processing during a TTI, is dependent on a modulation used.

4. A network node for assigning resource blocks to a Mobile Station, MS, served by the network node, wherein the MS is capable of downlink multicarrier operation, the network node being configured to perform operations comprising:
receiving, from the MS, an indication of a maximum number of consecutive downlink timeslots that the MS is capable of receiving on a given carrier during a Transmission Time Interval, TTI,
receiving, from the MS, an indication of a maximum number of resource blocks that the MS is capable of processing during a TTI,
receiving, from the MS, an indication of a maximum number of carriers supported by the MS,
assigning resource blocks to the MS, wherein the assigning is based on the received indication of a maximum number of consecutive downlink TS, on the received indication of a maximum number of resource blocks and on the received indication of a maximum number of carriers; and
increasing an uplink bandwidth without reducing a downlink bandwidth responsive to assigning the resource blocks to the MS,
wherein each of the resource blocks comprise information transmitted within a defined time duration and using a fixed bandwidth.

5. The network node according to claim 4, wherein the maximum number of carriers supported by the MS is indicated in at least one of:
a MS Radio Access Capability information element, and
a MS Classmark 3 information element.

6. The network node according to claim 4, wherein the indication of the maximum number of resource blocks that the MS is capable of processing during a TTI, is dependent on a modulation used.

7. A method in a Mobile Station, MS, for handling assignment of resource blocks, wherein the MS is served by a network node, and wherein the MS is capable of downlink multicarrier operation, the method comprising:
signaling, to the network node, an indication of a maximum number of consecutive downlink timeslots that the MS is capable of receiving on a given carrier during a Transmission Time Interval, TTI,
signaling, to the network node, an indication of a maximum number of resource blocks that the MS is capable of processing during a TTI,
signaling, to the network node, an indication of a maximum number of carriers supported by the MS,
receiving, from the network node, an assignment of resource blocks, which assignment is based on the signaled indication of a maximum number of consecutive downlink TS, on the signaled indication of a maximum number of resource blocks and on the signaled indication of a maximum number of carriers; and
receiving an increase of an uplink bandwidth without receiving a reduction of a downlink bandwidth responsive to receiving the assignment of the resource blocks from the network node,
wherein each of the resource blocks comprise information received within a defined time duration and using a fixed bandwidth.

8. The method according to claim 7, wherein the maximum number of carriers supported by the MS is indicated in at least one of:
a MS Radio Access Capability information element, and
a MS Classmark 3 information element.

9. The method according to claim 7, the indication of a maximum number of resource blocks that the MS is capable of processing during a TTI, is dependent on a modulation used.

10. A Mobile Station, MS, for handling assignment of resource blocks, wherein the MS is served by a network node, and wherein the MS is capable of downlink multicarrier operation, the MS being configured to perform operations comprising:
signaling, to the network node, an indication of a maximum number of consecutive downlink timeslots that the MS is capable of receiving on a given carrier during a Transmission Time Interval, TTI,
signaling, to the network node, an indication of a maximum number of resource blocks that the MS is capable of processing during a TTI,
signaling, to the network node, an indication of a maximum number of carriers supported by the MS, and
receiving, from the network node, an assignment of resource blocks, which assignment is based on the signaled indication of a maximum number of consecutive downlink TS, on the signaled indication of a maximum number of resource blocks and on the signaled indication of a maximum number of carriers; and
receiving an increase of an uplink bandwidth without receiving a reduction of a downlink bandwidth responsive to receiving the assignment of the resource blocks from the network node,
wherein each of the resource blocks comprise information received within a defined time duration and using a fixed bandwidth.

11. The MS according to claim 10, wherein the maximum number of carriers supported by the MS is indicated in at least one of:
a MS Radio Access Capability information element, and
a MS Classmark 3 information element.

12. The MS according to claim 10, wherein the indication of a maximum number of resource blocks that the MS is capable of processing during a TTI, is dependent on a modulation used.

* * * * *